United States Patent [19]

Carouthers et al.

[11] 4,336,773
[45] Jun. 29, 1982

[54] ENERGY CONSERVATION APPARATUS FOR INTERNAL COMBUSTION ENGINES

[75] Inventors: Middleton M. Carouthers, 573 Briarwyck, Ballwin, Mo. 63011; Robert L. Klamm, St. Charles, Mo.

[73] Assignee: Middleton M. Carouthers, Ballwin, Mo.

[21] Appl. No.: 164,021

[22] Filed: Jun. 30, 1980

[51] Int. Cl.³ .................... F02M 25/02; F02D 19/00
[52] U.S. Cl. .............................. 123/25 B; 123/25 L; 123/25 P
[58] Field of Search ................. 123/25 R, 25 A, 25 B, 123/25 E, 25 L, 25 P

[56] References Cited

U.S. PATENT DOCUMENTS

| | | | |
|---|---|---|---|
| 1,245,861 | 11/1917 | Bowers | 123/25 B |
| 1,504,018 | 8/1924 | Berard | 123/25 B |
| 1,848,455 | 3/1932 | Bashford | 123/25 B |
| 2,715,894 | 8/1955 | Shirrell | 123/25 B |
| 2,811,146 | 10/1957 | Spillmann | 123/25 P |
| 3,552,364 | 1/1971 | Short et al. | 123/25 P |
| 3,778,039 | 12/1973 | Dore | 123/25 R |
| 3,955,542 | 5/1976 | Skaggs | 123/25 L |
| 4,019,472 | 4/1977 | Skaggs | 123/25 L |
| 4,027,630 | 6/1977 | Giardini | 123/25 P |
| 4,059,078 | 11/1977 | de la Rosa | 123/25 K |
| 4,078,527 | 3/1978 | Yasuda | 123/25 B |
| 4,119,063 | 10/1978 | Lohberg | 123/25 B |

Primary Examiner—Ira S. Lazarus
Attorney, Agent, or Firm—Gravely, Lieder & Woodruff

[57] ABSTRACT

Energy conservation apparatus for internal combustion engines in which a restriction device is used with a fluid supply associated with a heat exchanger which converts the fluid into a vapor prior to being drawn into the fuel-air mixing carburetor or injector, the apparatus utilizing the negative pressure from the engine for moving the fluid through the system at a rate related to the engine displacement. In the apparatus, the restriction device effects control over the fluid quantity being moved into the engine in a vapor state, and operates through the presence of a fine-bore tube of a fixed diameter in the passage between the fluid supply and the engine.

12 Claims, 3 Drawing Figures

ENERGY CONSERVATION APPARATUS FOR INTERNAL COMBUSTION ENGINES

BACKGROUND OF THE INVENTION

1. Field of the Invention

This invention pertains to energy conservation apparatus for converting a vaporizable liquid into its vapor form and passing it into the fuel intake side of the carburetor for improving fuel utilization in internal combustion engines.

2. Description of the Prior Art

It is known generally to supply water vapor or steam into the carburetor of an internal combustion engine for gaining several advantages. The introduction of steam into an engine combustion chamber promotes better combustion and utilization of the fuel. One such apparatus is disclosed in U.S. Pat. No. of Yasuda 4,078,527 of Mar. 14, 1978. In this patent the increase and decrease of the suction or negative pressure due to the working of the pistons is applied to a flow-regulating valve movable according to the strength of the negative pressure and operates the valve by such negative pressure so that the jetted quantity of steam is correlated to the supplied quantity of fuel.

Other examples of apparatus for converting water into steam or vapor for use in internal combustion engines are found in Giardini U.S. Pat. No. 4,027,630 of June 7, 1977; Ramiro de la Rosa U.S. Pat. No. 4,059,078 of Nov. 22, 1977; and Lohberg U.S. Pat. No. 4,119,063 of Oct. 10, 1978. These examples are directed to complicated systems for controlling the amount of steam generated for admixture with the fuel-air mixture. The disclosure of Short et al U.S. Pat. No. 3,552,364 of Jan. 5, 1971 applies the heat generated in the vehicle automatic transmission to the heating of water for use in internal combustion engines.

BRIEF SUMMARY OF THE INVENTION

The apparatus of this invention embodies a source of liquid, such as water, which is sucked by the negative pressure created in the combustion chambers of an internal combustion engine through a metering device before reaching a heat transfer passage where the heat of the engine exhaust manifold converts the water into steam which then is conducted to the intake side of the fuel-air mixing carburetor.

It is an important object of the invention to substantially match the metering device of the apparatus to the engine displacement which is normally expressed in cubic inches of displacement so that a more desirable relationship of steam or vapor to the fuel-air mixture can be obtained for conservation of energy by improving utilization of fuel.

It is another object of the invention to provide a metering device for the foregoing embodiment of apparatus which has no moving elements to wear out or cause other problems.

It is a further object of the invention to provide the apparatus with a liquid metering device and engine exhaust heat transfer means as close to the point of induction to the carburetor as is permitted by the presence of other important engine components so that the vapor or steam does not return to its liquid state in any substantial amounts.

BRIEF DESCRIPTION OF THE DRAWING

The preferred embodiment of the present invention is shown in the accompanying drawings, wherein.

DETAILED DESCRIPTION OF THE EMBODIMENT

Figure 1:
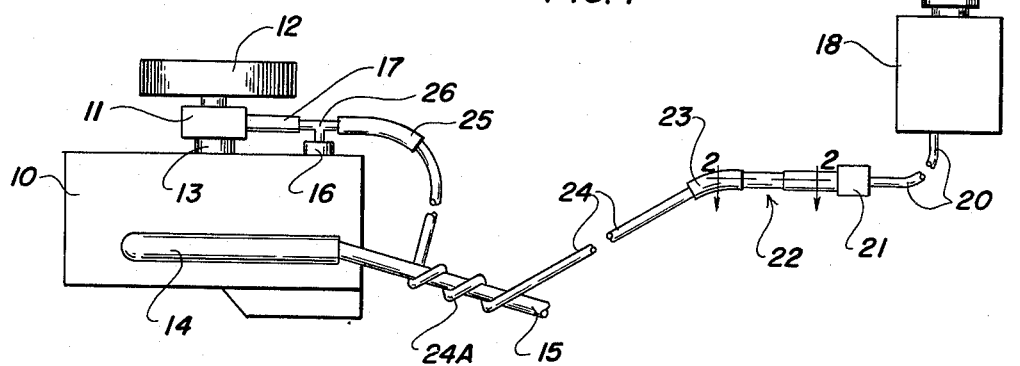
FIG. 1 is a schematic view of an internal combustion engine provided with the apparatus for converting a liquid to a vapor or steam and conducting it into the negative pressure side of the fuel-air carburetor.

FIG. 1 discloses the system of this invention as applied schematically to an internal combustion engine 10 having the usual fuel-air mixing carburetor 11 and air cleaner 12. The carburetor 11 has its normal connection into the intake manifold 13 of engine 10, and combustion exhaust is directed by an exhaust manifold 14 into the usual pipe 15 leading to the muffler (not shown). A polution control valve (PCV) 16 is mounted on the engine near the carburetor and a conduit 17 is provided to connect the PCV 16 into the carburetor 11. The foregoing arrangement of the engine components is well known and is subject to variations to suit engine cubic inch displacement (CID) and arrangement of cylinders.

The embodiment of this invention comprises a water reservoir which may be a flexible bag 18 having a vented filler cap 19, the bag being normally supported in the engine compartment. A flexible conduit 20 leading from the bag 18 to the filter 21 which may be a 10 micron type inserted in conduit 20 which connects to the inlet side of a flow restrictor and metering means 22, an outlet flexible conduit 23 connects with a metallic pipe 24 having a part 24A of its length acting as a heat exchanger wrapped about the engine hot gas exhaust pipe 15, and a flexible conduit 25 connecting the outlet end of the pipe 24A into a T-fitting 26 inserted in the conduit 17 from the PVC 16 to the carburetor 11. The system can be rendered inactive by disconnecting the conduit 20 at the water supply bag 18, or by not putting water in the bag.

Figure 2:
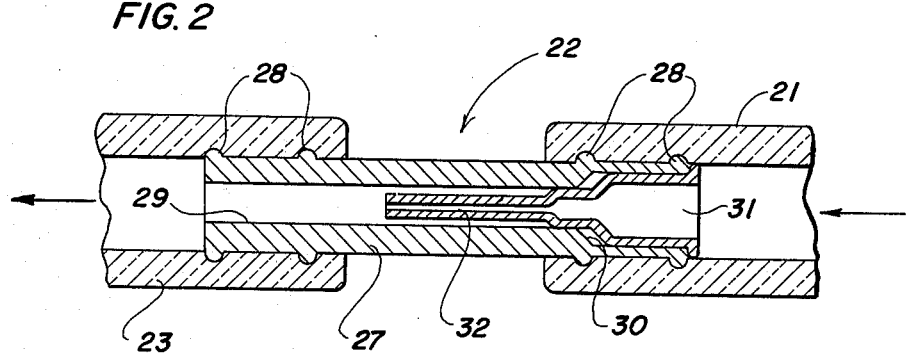
FIG. 2 is an enlarged sectional view of the metering device embodied in the schematic view of FIG. 1.

FIG. 2 is a greatly enlarged sectional view of the flow restrictor 22 comprised of a body 27 having annular ribs 28 at its opposite ends which are adapted to make a tight connection with the inlet conduit 21 and the outlet conduit 23. The bore 29 of the body 27 is formed with a socket 30 at its inlet end for the press-fit reception of the cup-shaped base 31 of a flow restricting fine-bore tube 32 projecting into the bore 29. The tube 32 meters the flow of water in response to the pressure drop across the body 27 generated by the negative pressure in conduit 23 when the engine is running and atmospheric pressure in conduit 21 is bringing the water to the body 27. Water passes out of the fine-bore tube 32 in droplet form as a result of the resistance imposed by the action of the tube bore. The base 31 of the tube 32 is pressfitted so that no leakage will occur to bypass the fine-bore of the tube 32.

The present embodiment of restrictor 22 is in the form of an aluminum body 27 which is counterbored to a diameter suitable for the press-fit reception of the base 31 which is aluminum to expand or contract with the body 27 and not develop leakage as the result of being subjected to engine heat. The body may vary in length from about one and one-half inches to about one and three-quarters inches. The wall thickness in the socket 30 needs to be sufficient to sustain the pressure differential to which it is exposed. The flow restrictor tube 32 is formed of stainless steel to resist corrosion which might otherwise develop if formed of aluminum. The fine-bore in the tube 32 may vary from about 0.008 inch to about 0.027 inch, depending on the cubic inch displacement (CID) of the engine 10. The tube 32 may have an effective fine-bore length of about one inch, as that length has been found to provide a generally satisfactory engine performance in trials on such vehicles as a 1972 Cadillac with a 400 CID engine, a 1978 Mercury Marquis with a 350 CID engine, and a 1978 GMC, 4 WD, pickup with a 400 CID engine. If a shorter length tube 32 is used with no change in the diameter of its bore, more water will be allowed to pass.

As an example of conservation of fuel for the foregoing vehicles, it has been found that the miles per gallon improvement is at least twenty percent. The average vehicle is expected to use fuel (gasoline) at the rate of about 20 miles per gallon, and with a cruise range of about 360 miles, it will be necessary to provide water in the quantity of about one pint for each gallon of gas consumed. That relation of water to fuel is satisfied if the ratio of one gallon of water to eight gallons of fuel is maintained. If a vehicle is provided with an eighteen gallon fuel tank, it should also be provided with a water supply of about two and one-fourth gallons. The normal vehicle has adequate space in the engine area for a water container of at least 2 to 3 gallon capacity, but if more water is needed for the "high mileage" vehicles the water may be carried in a larger container in the trunk area with a suitable conduit connection brought up near the engine. Since tap water is most likely to be used, a filter 21 is important to prevent material plugging the fine-bore in tube 32. The use of stainless steel for tube 32 is important to protect against corrosion.

Figure 3:
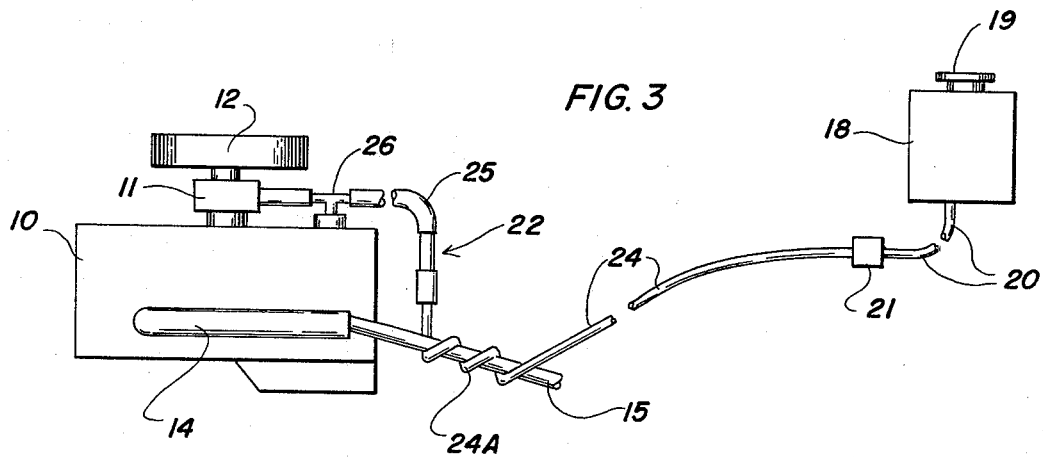
FIG. 3 is a view similar to that of FIG. 1, but showing a modification thereof.

FIG. 3 is a schematic view of a modified arrangement of the energy conservation apparatus in which the flow restrictor 22 of FIG. 2 is located between the heat exchanger 24A and the T-connector 26 for the PCV means. Since steam or vapor with some traces of liquid now flows through the fine-bore tube 32, the size of that bore may be reduced to offer substantially the same restriction to the passage thereof into carburetor 11 as is developed for the arrangement of FIG. 1.

It has been found that, in addition to conserving energy by improving the utilization of the fuel, the induction of steam (or water vapor) in the quantities allowed by the bore size of the tube 32 has the tendency at normal road speed to smooth out the engine operation. It also decreases the constituents of fuel combustion such as nitrogen oxide, and carbon monoxide. As others have found, further advantages are obtainable. Furthermore, the provision of a fixed length fine-bore tube 32 for any given CID engine, avoids the significant expense of adjustable type or valvular type means to govern the generation of steam for induction with the fuel-air mixture into an engine. The tube 32 having the small 0.008 inch bore is suitable for the small CID engines and a tube having a larger 0.027 inch bore is suitable for the large CID engines. It has been found that three different fine-bore tubes in restrictors 22 will accommodate the CID range of engines being offered.

It is recognized that at idle, an engine generates a certain negative pressure at the carburetor, while at normal road speeds, the negative pressure decreases to about its lowest value. When the engine is decelerating it generates its highest negative pressure. This change in the negative pressure is characteristic of substantially all internal combustion piston engines. The present restrictor means 22 has taken this characteristic into account in the sizing of the fine-bore in tube 32. For the several engines tested, the bore for tube 32 has varied from 0.008 to 0.015 inches, and this range may be sufficient for the current engine sizes.

While the foregoing description has been given in relation to a preferred embodiment of the invention, it will be understood by those skilled in the field of this invention that some changes in the construction and sizing of parts may be made within the scope of the disclosure.

What is claimed is:

1. Energy conservation apparatus for internal combustion engines having a carburetor for inducting fuel and air to form a combustible mix, and hot exhaust gas discharge means, said apparatus comprising:
   (a) a source of vaporizable fluid; and
   (b) fluid flow conducting means between said fluid source and the engine carburetor, including in fluid flow relationship:
      (1) heat exchange means in advance of the engine carburetor for imparting engine exhaust gas heat to the fluid to vaporize the fluid,
      (2) fluid flow restricting means having a non-adjustable fixed diameter and constantly open tube through which the fluid is directed, and
      (3) a fluid connection at the engine carburetor, whereby the induction effect generated by the engine at the carburetor establishes a negative pressure in said fluid flow conducting means to move the vaporizable fluid past said heat exchange means and into the carburetor.

2. The apparatus of claim 1, wherein said fluid flow restricting means is positioned in said fluid flow conducting means between said source of vaporizable fluid and said heat exchange means.

3. The apparatus of claim 1, wherein said fluid flow restricting means is positioned in said fluid flow conducting means beyond said heat exchange means in relation to said source of vaporizable fluid.

4. The apparatus of claim 1, wherein said fluid flow restricting means includes a body having a passage therethrough with an inlet and an outlet end, and a fine-bore tube mounted in said body inlet and projecting into said body passage toward said outlet end; said tube having a predetermined constant length and substantially uniform internal diameter.

5. The apparatus of claim 4, wherein said fine-bore of said tube is selected from those having a bore diameter which falls into the range of from 0.008 to 0.027 inches.

6. The apparatus of claim 4, wherein said fine-bore tube has a length which varies from about one-half inch to about one inch.

7. The apparatus of claim 4, wherein said fine-bore tube has a bore diameter of substantially 0.014 inch for restricting the flow of fluid under a negative pressure influence generated by engines having a cubic inch displacement which varies from substantially 250 to 400.

8. The apparatus of claim 4, wherein said fine-bore tube is fixedly mounted in said inlet end of said body and said tube has an internal diameter selected from smallest at substantially 0.008 inches to largest at substantially 0.027 inches, the selection of an internal diameter for said fine-bore tube being related in proportion to the engine cubic inch displacement.

9. Energy conservation apparatus for internal combustion engines having fuel-air mixing carburetion means and hot exhaust gas manifold means, said apparatus comprising:
 (a) a source of water;
 (b) heat exchange means in heat transfer association with the engine hot exhaust gas manifold means;
 (c) conduit means connecting said heat exchange means with the carburetion means for conducting vaporized water into the carburetor means to be added to the fuel-air mixing at the carburetor; and
 (d) means interconnecting said source of water and said heat exchange means including an unobstructed water flow metering means having a chamber provided with a fixed length and size inlet restricting means and a water outlet for releasing water to flow to said heat exchange means induced by the negative pressure generated at the carburetion means during engine operation inducting a fuel-air mixture, said released water being converted to vapor prior to being inducted to said carburetor.

10. Energy conservation apparatus for internal combustion engines for improving the utilization of the fuel in such engines having fuel-air induction means and a hot exhaust gas system, said apparatus comprising:
 (a) a source of heat vaporizable fluid; and
 (b) fluid flow conducting means extending between said fluid source and the fuel-air induction means, including
  (1) a portion thereof in heat transfer relationship with a portion of the hot engine exhaust gas system,
  (2) a portion connected in engine suction relation with the fuel-air induction means, and
  (3) an open bore fluid flow restricting device in the flow conducting means for controlling the amount of the fluid vapor following the vaporization thereof by said exhaust gas system as the fluid is sucked by the engine operation through said flow conducting means for admixture with the fuel-air inducted by the engine.

11. The apparatus of claim 10 wherein said restricting device is in said flow conducting means adjacent the fuel-air induction means for the engine, and said device has an opening the size of which varies depending upon the cubic inch displacement of the engine from about 0.008 inch to about 0.027 inch.

12. The apparatus of claim 10 wherein said restricting device forms a restriction in said flow conducting means of a fixed size.

* * * * *